United States Patent [19]

Uriarte et al.

[11] Patent Number: 4,808,634

[45] Date of Patent: Feb. 28, 1989

[54] LOW DENSITY SILICON FOAM

[75] Inventors: Richar J. Uriarte, Clifton Park; David C. Gross, Schenectady, both of N.Y.

[73] Assignee: General Electric Company, Waterford, N.Y.

[21] Appl. No.: 172,727

[22] Filed: Mar. 24, 1988

[51] Int. Cl.$^4$ ................................. C08J 9/02
[52] U.S. Cl. .................................... 521/87; 521/88; 521/91; 521/95; 521/134; 521/154; 528/15; 528/31; 528/32; 528/33
[58] Field of Search ............ 521/87, 88, 91, 95, 521/134, 154

[56] References Cited

U.S. PATENT DOCUMENTS

| | | | |
|---|---|---|---|
| 3,024,126 | 3/1962 | Brown | 106/308 |
| 3,635,743 | 1/1972 | Smith | 106/288 |
| 3,837,878 | 9/1974 | Beers | 106/308 |
| 3,923,705 | 12/1975 | Smith | 260/2.5 S |
| 4,189,545 | 2/1980 | Modic | 521/131 |
| 4,418,157 | 3/1983 | Modic | 521/82 |
| 4,555,560 | 11/1985 | Saruyama et al. | 528/17 |
| 4,613,630 | 9/1986 | Bauman et al. | 521/134 |
| 4,705,877 | 11/1987 | Gornowicz et al. | 556/422 |
| 4,705,878 | 11/1987 | Gornowicz et al. | 556/422 |

FOREIGN PATENT DOCUMENTS 2065661  7/1981  United Kingdom .

Primary Examiner—Morton Foelak
Attorney, Agent, or Firm—John W. Harbour

[57] ABSTRACT

Ketoxime compounds are added to foamable elastomeric silicone foam contain organic alcohol as a hydroxyl source to reduce foam density.

40 Claims, No Drawings

LOW DENSITY SILICON FOAM

The present invention relates to low density silicone foam. More particularly, the present invention relates to low density silicone foam which is produced by simultaneous vinyl addition and hydride/hydroxy reactions in the presence of certain ketoxime compounds.

BACKGROUND OF THE INVENTION

Elastomeric silicone foams are well known and have a variety of uses, including thermal insulation, electrical insulation, flame barrier, cushioning applications, etc. Elastomeric silicone foams have excellent physical properties and in addition to the above uses are suitable and desirable for use in many additional applications. However, there is a problem with elastomeric silicone foam that it is expensive and at 15–25 lb/ft$^3$, the ability to reduce price is limited by the basic costs of silicone material.

The technical advances necessary to significantly reduce the basic cost of silicone material are not on the horizon, thus it is clear that to immediately reduce the cost of elastomeric silicone foam it is necessary to reduce the density of the foam. Although this may seem to be a simple matter of adding additional blowing agent, etc., it is an aspect of elastomeric silicone foam as presently used that density is not easily lowered. The reasons for this are apparent with a review of silicone foam technology.

U.S. Pat. No. 3,923,705, Smith, discloses that elastomeric silicone foams may be produced with a single reaction that both cross-links to cure the composition as well as produces hydrogen gas to blow the foam. This reaction takes place between a silanol and silicon hydride. Optionally, there can be added a vinyl containing silicone that will simultaneously cross-link through addition with a silicon hydride without gas generation. Obviously, this is a convenient method to produce silicone foam. It is also true, however, that gas generation must be proportional to cross-linking or cure rate and therefore density is difficult to control.

U.S. Pat. No. 4,189,545, Modic, produces silicone foam compositions by adding water. For example, water could be added to a composition of a vinyl containing siloxane, a hydride containing siloxane and platinum to generate gas at a rate only indirectly related to cross-linking rate. The water reacts with hydride containing siloxane to produce hydrogen gas and silanol. Silanol reacts with hydride containing siloxane to cross-link and produce a second molecule of hydrogen gas. A vinyl addition reaction with silicone hydride will cross-link the composition simultaneously. Thus, a major advantage of Modic is that gas is produced without the addition of silanol and with only small amounts of water.

U.S. Pat. No. 4,418,157, Modic, reduces density and strengthens silicone foam by adding a resinous copolymer. U.S. Pat. No. 4,599,367, Baumann, et al., reduces density by using a combination of silanol and water.

There have been two disclosures to date of methods and additives by which the self-blowing characteristics of elastomeric silicone foam is controlled independently of cure. Copending U.S. Pat. Ser. No. 113,292 filed Oct. 26, 1987, and U.S. Pat. Ser. No. 113,023 filed Oct. 26, 1987, add an amine compound or a silica filler with surface nitrogen prior to blowing to lower foam density. It is believed that the presence of these materials accelerates gas formation while delaying cure. Thus, gas formation and cure are optimized to reduce foam density.

It is desirable to develop additional additives to reduce foam density. Such additives should also reduce cell size and improve cell uniformity.

Thus, it is an object of the present invention to develop additives to reduce foam density.

It is a further object of the present invention to develop such an additive that reduces cell size as well as improves cell uniformity.

These and other objects of the present invention are accomplished by means of the disclosure set forth hereinbelow.

SUMMARY OF THE INVENTION

Briefly, there is provided by the present invention a foamable composition comprising:

(a) 100 parts by weight of a vinyl-containing polysiloxane of the formula:

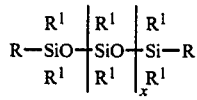

where R and R$^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

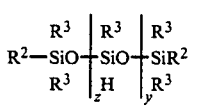

(2)

where R$^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously a single —O— to form a cyclic polymer, and R$^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from organic alcohol or organic alcohol in combination with water or hydroxylated organosiloxane, in an amount to provide a molar ratio of from about 0.02/1 to about 15/1 of hydroxyl radicals to silicon-bonded hydrogen atoms of component (b);

(d) from about 1 to about 250 parts per million of platinum catalyst; and (e) an amount of ketoxime compound effective to lower foam density of the formula:

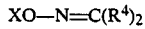

(3)

where each R$^4$ *is independently a substituted or unsubstituted monovalent hydrocarbon of from* 1 to about 10 carbon atoms or both R⁴ groups combined are fused to a single substituted or unsubstituted divalent hydrocarbon of from 1 to about 15 carbon atoms, X is hydrogen, a substituted or unsubstituted silyl, or a substituted or unsubstituted hydrocarbon of from 1 to 10 carbon atoms.

DETAILED DESCRIPTION OF THE INVENTION

In the vinyl-containing polysiloxane, component (a) as shown in formula (1) R and $R^1$ may be substituted or unsubstituted hydrocarbon radicals of from 1 to 20 carbon atoms with the proviso that there is controlled vinyl substitution and controlled viscosity. The vinyl substitution should range from about 0.0002 to 3% by weight and preferably, from about 0.001 to about 1% by weight. Viscosity should vary from about 100 to about 1,000,000 centipoise at 25° C. and preferably, from about 2500 to 500,000 centipoise. Although a polymer having a broader range of vinyl content will operate in the present invention, the more limited vinyl concentration given above will allow for a reaction that proceeds at an appropriate rate, that is not too slow and allows for proper cross-linking in the polymer to produce cured elastomeric silicone foam. With respect to the preferred range of viscosity, as can be appreciated, it is preferred that the viscosity not be too high, otherwise the composition is difficult to handle and will not foam well. The vinyl-containing polymer will form the major part of the foamable composition and thus the viscosity will be important to the viscosity of the final composition.

Substituted or unsubstituted hydrocarbon radicals of R and $R^1$ may be selected from alkyl radicals, methyl, ethyl, propyl, etc.; cycloalkyl radicals such as cyclohexyl, cycloheptyl, etc; mononuclear aryl radicals such as phenyl, methyl phenyl, ethylphenyl, etc.; alkenyl radicals such as vinyl, allyl, etc. and more preferably vinyl and other well known substitutent groups for diorganopolysiloxane polymers. Preferably the R and $R^1$ radicals are selected from the class consisting of alkyl radicals of 1 to 8 carbon atoms, aryl radicals such as phenyl; vinyl radicals and halogenated hydrocarbon radicals such as fluoroalkyl radicals of 3 to 8 carbon atoms, such as, for instance 3,3,3-trifluoropropyl. Most preferably $R^1$ radicals are selected from methyl radicals, phenyl radicals, vinyl radicals and 3,3,3-trifluoropropyl radicals where the polymer has the foregoing vinyl substitution and R is vinyl. Although vinyl-containing polysiloxane where the vinyl units appear only on the siloxane chain can be used to produce silicone foam, the physical properties are not as good as where there is terminal vinyl substitution. A particularly preferred polymer has only terminal vinyl substitution, i.e. where R is vinyl and $R^1$ is methyl, phenyl, and/or 3,3,3-trifluoropropyl.

Vinyl-containing polysiloxanes are well known in the art and may be produced by a variety of methods, for instance, by equilibrating cyclic polysiloxanes with or without vinyl substitution in the presence of appropriate amounts of vinyl substituted chainstopper. Further details for production of vinyl-substituted polysiloxanes may be found in U.S. Pat. No. 3,425,967 to Modic. Further suitable vinyl-containing polysiloxanes may be found in U.S. Pat. Nos. 4,599,367; 4,418,157 and 3,923,705, all of which are incorporated herein by reference.

For each 100 parts by weight of vinyl-containing polysiloxane, component (a), there should be present in the foamable composition from about 1 to 50 parts by weight of hydride polysiloxane, component (b), and preferably, from about 5 to 30 parts by weight. As shown above in formula (2), $R^2$ may be independently hydrogen, an alkyl radical of from 1 to 8 carbon atoms, an aryl radical from 1 to 8 carbon atoms or a haloalkyl radical of 3 to 8 carbon atoms or simultaneously a single —O— to form a cyclic polymer and $R^3$ may be selected from the same radicals as $R^2$ absent hydrogen and oxygen. It is preferred that the hydride polysiloxane have a hydrogen content ranging from about 0.3 to about 1.6% by weight and as shown in formula (2), z and y vary to provide a viscosity ranging from 1 to 500 centipoise at 25° C. The hydride content is not critical but such a content substantially less than about 0.3% by weight of the hydride polysiloxane may not provide sufficient hydrogen in the foamable composition to react with the hydroxy source and liberate hydrogen gas as well as react and cross-link with vinyl molecules of the vinyl-containing polysiloxane. The result will of course be a poorly blown and undercured foam. Likewise, viscosity of the hydride polysiloxane is not critical, but higher viscosity materials may be difficult to obtain and utilize. Preferably, viscosity ranges from about 5 to about 250 centipoise at 25° C. and most preferably from about 5 to 100 centipoise.

As seen in formula (2) above, it is critical that the hydride polysiloxane contain hydrogen on the siloxane chain. It is optional that hydrogen atoms are a substituent on terminal siloxy atoms. If there are no hydrogen atoms in the polymer chain of the hydride polysiloxanes, then a proper silicone foam is not obtained. Accordingly, a hydride polymer with only hydrogen radicals on terminal siloxy atoms will not work to form a silicone foam in the composition of the instant case.

A hydroxyl source is necessary to properly blow the foamable composition. The source of hydroxyl herein may be selected from organic alcohol or organic alcohol in combination with water or silanol.

Organic alcohols suitable for use herein may be substituted or unsubstituted, mono or polyols, preferably having from about 1 to 12 carbon atoms. Substituent groups may serve to increase the solubility of the alcohol or to improve the dispersability of an insoluble species. Preferred organic alcohols include methanol ethanol, propanol, butanol, lauryl alcohol, octyl alcohol, ethylene glycol, etc. Most preferred herein is methanol.

Suitable silanols include any hydroxylated organosiloxane or hydroxylated organosiloxane mixture having an average of 1 to 2.5 silicon-bonded hydroxyl radicals per molecule. The organo radicals can be any radical described above for R and $R^1$. The silanols may be homopolymers, copolymers or mixtures thereof. It is preferred that the silanol contain at least one organic radical in a molecule per silicon atom. Examples of suitable silanols include hydroxyl end-blocked polydimethylsiloxane, hydroxyl end-blocked polydiorganosiloxane having siloxane units of dimethylsiloxane and phenylmethylsiloxane, hydroxyl end-blocked polymethyl-3,3,3-trifluoropropylsiloxane and hydroxyl end-blocked polyorganosiloane having siloxane units of monomethylsiloxane, dimethylsiloxane, with the monomethylsiloxane units supplying "on-chain" hydroxyl groups. The silanol also includes mixtures of hydroxylated organosiloxane polymers and hydroxylated organosilanes, such as mixture of hydroxyl end-blocked polydimethylsiloxane and diphenylmethylsilanol.

Each of the above enumerated hydroxyl sources will react with hydrogen of the hydride polysiloxane to produce hydrogen gas. Although this reaction is common and required of any hydroxyl source utilized, the by-product of the reaction may differ and produce other benefits or require attention as known to the art. Water will react with the hydride function to produce a hydroxyl function which can further react with a second hydride to produce additional gas and a cross-link site. Thus, where water is employed, additional gas will be generated as a benefit, but gassing after cure may occur. Silanol, due to good solubility in the composition characteristically produces gas immediately but may lead to problems of premature gelation. Organic alcohol does not as easily react with the hydride function and thus is generally used in silanol or water combinations. Herein, however, it has been found that the organic alcohol, particularly methanol, reduces density when combined with ketoxime. Persons skilled in the art are familiar with each of the above. For further teaching there are U.S. Pat. Nos. 4,189,545; 4,418,157; 4,599,367; and 3,923,705, hereby incorporated by reference.

Depending on the hydroxyl source used there should be from about 0.02/1 to about 15/1 moles hydroxyl radicals employed from the hydroxyl source for each silicon-bonded hydrogen atom in the hydride polysiloxane of component (b). Of course, this ratio is broadly stated, particularly at the upper boundary in view of the fact that hydride functions must be available to react with vinyl functions for cross-linking and should not be consumed by hydroxy functions. However, where water or difunctional hydroxyl compounds are used and much cross-linking takes place through hydroxy/hydride reactions or where vinyl concentration is very high, then the hydroxyl function to hydride function ratio may also be high. Preferably however, the ratio of hydroxyl radicals to hydride radicals should vary between about 0.02/1 to 10/1 and more preferably between about 0.5/1 to about 7/1.

Suitable platinum compound for use as the catalyst herein are well known. The preferred platinum catalysts are soluble in the present reaction mixture. The platinum compound can be selected from those having the formula (PtCl$_2$.Olefin)$_2$ and H(PtCl$_3$.Olefin) as described in U.S. Pat. No. 3,159,601, Ashby. The olefin shown in the previous two formulas can be almost any type of olefin but is preferably an alkenylene having from 2 to 8 carbon atoms, a cycloalkenylene having from 5 to 7 carbon atoms or styrene. Specific olefins utilizable in the above formulas are ethylene, propylene, the various isomers of butylene, octylene, cyclopentene, cyclohexene, cycloheptene, etc.

A further platinum containing material usable in the composition of the present invention is the platinum chloride cyclopropane complex (PtCl$_2$C$_3$H$_6$)$_2$ described in U.S. Pat. No. 3,159,662, Ashby. Still further, the patent containing material can be a complex formed from chloroplatinic acid with up to 2 moles per gram of platinum of a member selected from the class consisting of alcohols, ethers, aldehydes and mixtures of the above as described in U.S. Pat. No. 3,220,972, Lamoreaux.

The preferred platinum compound to be used not only as a platinum catalyst, but also as a flame retardant additive is that disclosed in U.S. Pat. No. 3,775,452, Karstedt. Generally speaking, this type of platinum complex is formed by reacting chloroplatinic acid containing 4 moles of water of hydration with tetramethyltetravinylcyclosiloxane in the presence of sodium bicarbonate in an ethanol solution.

Finally, in the process of the instant case there is utilized generally from 1 to 250 parts per million of a platinum catalyst and more preferably 1 to 200 parts per million of a platinum catalyst. It is more preferred to utilize a stabilized platinum complex in the process of the instant case since it disperses in the ingredients much more easily and as such results in faster reaction time.

The ketoxime is the critical element of the invention disclosed herein. Where R$^4$ is a monovalent hydrocarbon, it may be selected from alkyl, such as methyl, ethyl, n-propyl, iso-propyl, butyl, decyl and dodecyl; cycloalkyl, such as cyclohexyl; aryl, such as phenyl and naphthyl; alkaryl, such as tolyl or aralkyl, such as benzyl. Where both R$^4$ are fused to a divalent hydrocarbon radical R$^4$ might be cyclohexyl, cyclodecyl, etc.

X is preferably hydrogen. Thus, preferred ketoximes include:
acetone ketoxime
methylethyl ketoxime
diethyl ketoxime
phenylethyl ketoxime
diphenyl ketoxime
benzophenone ketoxime
methylisopropyl ketoxime
methylisobutyl ketoxime
cyclohexylmethyl ketoxime
(2-methoxy-5-methyl)phenyl nonyl ketoxime and hydroquinone oxime.

where X is silyl, even trace amounts of moisture will hydrolyze the compound to produce a preferred ketoxime. Thus, useful ketoximes include those of the formula:

$$[(R^4)_2C=NO]R_t^2SiO_{(4-s-t)/2}$$

where R$^4$ and R$^2$ are given above, s is 1, 2, 3 or 4; t is 0, 1, 2 or 3, and s+t=4 or less. Suitable ketoximes where X is silyl may be found in U.S. Pat. Nos. 4,555,560; 4,705,878; and 4,705,877, hereby incorporated by reference. Other suitable ketoximes include those where X is methyl, ethyl, etc.

It is preferred that the ketoxime compound be soluble in foamable composition. A soluble ketoxime compound will be more easily dispersed and, of course, if totally soluble have no discrete micelles to hinder contact with the composition. It is preferred that the amine have a solubility in components (a) and (b) ranging from about 0.1 millimole/liter to infinitely soluble.

A large amount of ketoxime compound in the foamable composition is not necessary and may detract from the desired effect. Therefore, there should be added from about 0.0001 to about 5 parts by weight ketoxime compound based on 100 parts by weight components (a), (b) and (c). Preferably there are added from about 0.001 to about 0.1 parts ketoxime compound as above.

Optionally the foamable composition herein may contain from 0 to 200 parts by weight by a filler, which may be either an extending or reinforcing filler. It should be noted that extending fillers are preferred since reinforcing filler such as fumed silica and precipitated silica when incorporated into the composition in any concentration unduly increase the viscosity of the composition, thus making it difficult to handle and to pour. However, fumed silica and precipitated silica have the advantages of increasing the physical properties, that is, the tensile strength as well as the tear of the silicone elastomeric foam that is formed from the composition.

Accordingly in the more referred embodiment of the instant case there is utilzled from 10 to 100 parts of filler based on 100 parts of the vinyl-containing base polymer. The filler may be selected from the class consisting of reinforcing fillers and extending fillers, and more preferably just extending fillers. A preferred extending filler that may be utilized in the instant composition which does not unduly increase the viscosity of the uncured composition is ground quartz. Ground quartz has the additional advantage that to some extent it increases the burn resistance properties of the cured silicone foam that is produced from the composition. Other extending fillers that may be utilized in the instant compositions are, for instance, titanium dioxide, lithopone, zinc oxide, zirconium silicate, silica aerogel, iron oxide, diatomaceous earth, calcium carbonate, glass fibers, magnesium oxide, chromic oxide, zirconium oxide, aluminum oxide, alpha quartz, calcined clay, carbon, graphite, etc.

It should be noted if reinforcing fillers are used such as fumed silica and precipitated silica, that in order to keep the viscosity increase in the composition as low as possible such filler, even the extending fillers, may be treated, for instance, with cyclicpolysiloxanes or silazanes. The disclosure in which silica fillers may be treated, for instance, with cyclicpolysiloxanes is set forth in U.S. Pat. No. 2,938,009, Lucas, which is hereby incorporated by reference. However, such is only one method of treating reinforcing fillers and other methods with other agents are also available in the art.

Another method of treating reinforcing fillers is, for instance, to be found in Brown, U.S. Pat. No. 3,024,126, disclosure of which is hereby incorporated by reference; Smith, U.S. Pat. No. 3,635,743 and Beers, U.S. Pat. No. 3,837,878. Such ingredients such as cyclicpolysiloxanes may also be utilized to treat extending fillers such as, ground quartz, with some advantage since such treatment does also alleviate the viscosity increase caused by extending fillers. However, as stated previously, the most preferred filler for utilization to produce silicone foam of the instant case, is ground quartz. Quartz enhances the burn resistant properties of the composition as well as imparting some enhanced physical properties to the final cured silicone foam.

The foamable composition is generally used and stored as a two-part composition. The platinum catalyst is incorporated, preferably, in the vinyl-containing polysiloxane. The hydroxyl source may be added to the vinyl-containing polysiloxane and incorporated in the hydride polysiloxane. Again, preferably, the hydroxyl source is incorporated into the vinyl-containing polysiloxane to prevent a chance of premature reaction, and since there is more vinyl-containing material, the incorporation is easier. It should also be appreciated that the hydroxyl source could constitute a third component. The ketoxime compound, like the platinum catalyst, should be incorporated into the vinyl-containing polysiloxane. The ketoxime compound may be dispersed on the surface of a filler and so added to the appropriate part of the composition. The ketoxime compound is dispersed on a filler by simply dipping or spraying the filler with ketoxime compound or solution and subsequently drying with gentle heat or vacuum.

When it is desired to form the silicone foam, the hydride polysiloxane is rapidly mixed with the vinyl-containing polysiloxane containing the hydroxyl source, platinum, and ketoxime compound, and the composition is poured into the desired cavity and allowed to stand. The composition will begin to crosslink and generate gas simultaneously to blow and cure to an elastomeric silicone foam having a density of less than 14 lb./ft.$^3$.

It is sometimes desired to have a certain amount of work life or pot life in the mixed composition prior to its cure. Accordingly, for such purposes, it is normal to use an inhibitor. It has been found that to the compositions of the instant case there is desirably used at least 200 parts per million based on the total composition of an inhibitor including a vinyl-containing cyclictetrasiloxane such as tetra methyl tetra-vinylcyclopolysiloxane, malleates or vinyl acetylene compounds. When added to the composition inhibitors give the composition some work life or pot life. Preferably inhibitors are added to the composition at a concentration of anywhere from 10 parts per million to 10,000 parts per million based on the total composition so as to give to the composition work life varying anywhere from 5 to 20 minutes at room temperature. Smaller amounts of inhibitor does not give an appreciable increase of work life at room temperature of the composition and larger amounts of the inhibitor may be used than 10,000 parts per million, per weight of the composition. However such has not been found to be necessary.

Of course additional additives for foam are well known. Carbon black, pigment, glass fibers, etc. may be added according to the skill of the art. Particularly preferred additives are MQ or MDQ resins with vinyl functions to lower density and increase strength. The addition of these resins is described in U.S. Pat. No. 4,418,157 incorporated herein by reference.

EXAMPLES

The examples below are given for the purpose of illustrating the practice of the above invention. They are not given for any purpose of setting limitations and defining the scope of the invention as set forth in the specification and claims. All parts are by weigbt.

EXAMPLES 1–7

A two part foamable composition was mixed as follows.

| Part A | |
|---|---|
| Polymer/Filler | Parts by Weight |
| Vinyl terminated polydimethylsiloxane mixture with MD$^{vinyl}$Q resin, total viscosity 30,000 cps at 25° C., 0.5% vinyl | 73 |
| Ground quartz | 25 |
| Calcium Carbonate | 2 |
| Karstedt platinum catalyst | 40 ppm Pt |
| H$_2$O | 1.5 |

| Part B | |
|---|---|
| Polymer | Parts by Weight |
| Poly-dimethyl-methylhydrogen siloxane, 1.5% by weight hydrogen | 66 |
| Vinyl terminated polydimethylsiloxane 85,000 cps @ 25° C. | 34 |

Compositions containing a 10:1 ratio of Part A:Part B were blended to form foamable compositions and poured into a mold at room temperature. Ketoxime and/or organic alcohol were first blended into Part A of each composition in the amounts shown in Table 1. The particular ketoxime was methylethyl ketoxime, MEK, and the organic alcohol was methanol. The reported amount for ketoxime, organic alcohol and inert carrier fluid is based on 100 parts by weight Part A and 10 parts by weight Part B. The inert carrier fluid, $MD_2M$, is employed so that small amounts of MEK can be accurately added.

TABLE 1

| Example | $CH_3OH$ (pbw) | MEK (ppm) | Inert Carrier Fluid (pbw) | Density $lbs/ft^3$ |
|---|---|---|---|---|
| 1 | — | — | — | 15.2 |
| 2 | — | — | 0.1 | 15.8 |
| 3 | — | 20 | 0.1 | 15.5 |
| 4 | 1.0 | — | — | 11.6 |
| 5 | 1.0 | 20 | 0.1 | 9.5 |

What is claimed is:

1. A foamable composition comprising:
   (a) 100 parts by weight of a vinyl-containing polysiloxane of the formula:

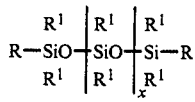

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

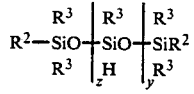

where $R^2$ is selected from the group consisting of independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from organic alcohol or organic alcohol in combination with water, or hydroxylated organosiloxane in an amount to provide a molar ratio of from about 0.02/1 to about 15/1 of hydroxyl radicals to silicon-bonded hydrogen atoms of component (b);

(d) from about 1 to about 250 parts per million of platinum catalyst; and (e) and amount of ketoxime compound effective to lower foam density of the formula:

$$XO-N=C(R^4)_2$$

where each $R^4$ is independently a substituted or unsubstituted monovalent hydrocarbon of from 1 to about 10 carbon atoms or both $R^4$ groups combined are fused for a single substituted or unsubstituted divalent hydrocarbon of from 1 to about 15 carbon atoms, X is hydrogen, a substituted or unsubstituted silyl, or a substituted or unsubstituted hydrocarbon of from 1 to 5 carbon atoms.

2. The composition of claim 1 wherein said vinyl-containing polysiloxane contains from about 0.001 to about 1% by weight vinyl.

3. The composition of claim 1 wherein said x varies such that the viscosity of the polymer varies from 2500 to 500,000 centipoise at 25° C.

4. The composition of claim 1 wherein R and $R^1$ are selected from the class consisting of alkyl radicals of 1 to 8 carbon atoms, aryl radicals, vinyl radicals, and halogenated hydrocarbon radicals of 3 to 8 carbon atoms.

5. The composition of claim 1 wherein R is vinyl and $R^1$ is selected from the group consisting of methyl, phenyl, and 3,3,3-trifluoropropyl.

6. The composition of claim 1 which contains from 5 to 30 parts by weight component (b).

7. The composition of claim 1 wherein said hydride polysiloxane has a viscosity between about 5 and 100 centipoise at 25° C.

8. The composition of claim 1 wherein said hydroxyl source is a combination of water with organic alcohol.

9. The composition of claim 1 wherein said hydroxyl source is a combination of hydroxylated siloxane organic alcohol.

10. The composition of claim 1 wherein said hydroxylated siloxane has an average of from greater than 1 to 2.5 silicon-bonded hydroxyl radicals per molecule.

11. The composition of claim 1 wherein said organic alcohol is a substituted or unsubstituted alcohol having from 1 to 12 carbon atoms.

12. The composition of claim 11 wherein organic alcohol is selected from the group consisting of methanol ethanol, propanol, butanol, lauryl alcohol, octyl alcohol and ethylene glycol.

13. The composition of claim 1 wherein the ratio of hydroxyl radicals to hydride radicals varies between 0.02/1 and 10/1.

14. The composition of claim 1 wherein $R^4$ is alkyl, cycloalkyl, aryl, alkaryl, or aralkyl.

15. The composition of claim 1 wherein said amine has a solubility in components (a) and (b) ranging upward from about 0.1 millimole/liter.

16. The composition of claim 1 which contains from about 0.0001 to 5 parts by weight of ketoxime compound.

17. The composition of claim 1 which contains from about 0.001 to about 0.1 parts by weight of ketoxime compound.

18. The composition of claim 1 wherein said X is hydrogen.

19. The composition of claim 1 wherein said ketoxime has the general formula:

$$[(R^4)_2C=NO]_sR_t^2SiO_{(4-s-t)/2}$$

where $R^4$ and $R^2$ are given; s is 1, 2, 3 or 4; t is 0, 1, 2 or 3; and s+t—4 or less.

20. A silicone foam comprising the reaction product of:

(a) 100 parts by weight of a vinyl-containing polysiloxane of the formula:

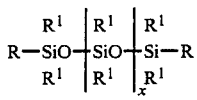

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

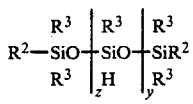

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxy source selected from organic alcohol or organic alcohol in combination with water or hydroxylated organosiloxane in an amount to provide a molar ratio of from about 0.02/1 to about 15/1 of hydroxyl radicals to silicon-bonded hydrogen atoms of component (b);

(d) from about 1 to about 250 parts per million of platinum catalyst; and (e) an amount of ketoxime compound effective to lower foam density of the formula:

$$XO-N=C(R^4)_2$$

where each $R^4$ is independently a substituted or unsubstituted monovalent hydrocarbon of from 1 to about 10 carbon atoms or both $R^4$ groups combined are fused to a single substituted or unsubstituted divalent hydrocarbon of from 1 to about 15 carbon atoms, X is hydrogen, a substituted or unsubstituted silyl, or a substituted or unsubstituted hydrocarbon of from 1 to 5 carbon atoms.

21. The article of claim 20 wherein said vinyl-containing polysiloxane contains from about 0.001 to about 1% by weight vinyl.

22. The article of claim 20 wherein said x varies such that viscosity of the polymer varies from 2500 to 500,000 centipoise at 25°.

23. The article of claim 20 wherein R and $R^1$ are selected from the class consisting of alkyl radicals of 1 to 8 carbon atoms, aryl radicals, vinyl radicals, and halogenated hydrocarbon radicals of 3 to 8 carbon atoms.

24. The article of claim 20 wherein R is vinyl and $R^1$ is selected from the group consisting of methyl, phenyl, and 3,3,3-trifluoropropyl.

25. The article of claim 20 which contains from 5 to 30 parts by weight component (b).

26. The article of claim 20 wherein said hydride polysiloxane has a viscosity between about 5 and 100 centipoise at 25° C.

27. The article of claim 20 wherein said hydroxyl source is a combination of water with organic alcohol.

28. The article of claim 20 wherein said hydroxyl source is a combination of hydroxylated siloxane with organic alcohol.

29. The article of claim 20 wherein said hydroxylated siloxane has an average of from greater than 1 to 2.5 silicon-bonded hydroxyl radicals per molecule.

30. The article of claim 20 wherein said organic alcohol is a substituted or unsubstituted alcohol having from 1 to 12 carbon atoms.

31. The article of claim 20 wherein organic alcohol is selected from the group consisting of ethanol, propanol, butanol, lauryl alcohol, octyl alcohol and ethylene glycol.

32. The article of claim 20 wherein the ratio of hydroxyl radicals to hydride radicals varies between 0.02/1 and 10/1.

33. The composition of claim 20 wherein $R^4$ is alkyl, cycloalkyl, aryl alkaryl or aralkyl.

34. The article of claim 20 wherein said ketoxime has a solubility in components (a) and (b) ranging upward from about 0.1 millimole/liter.

35. The article of claim 20 which contains from about 0.0001 to 5 parts by weight of ketoxime compound.

36. The article of claim 20 which contains from about 0.001 to about 0.1 parts by weight of ketoxime compound.

37. The composition of claim 20 wherein X is hydrogen.

38. The composition of claim 20 wherein said ketoxime has the general formula:

$$[(R^4)_2C=NO]_sR_t^2SiO_{(4-s-t)/2}$$

where $R^4$ and $R^2$ are given, s is 1, 2, 3 or 4; t is 0, 1, 2 or 3; and s+t=4 or less.

39. A foamable composition consisting essentially of:

(a) 100 parts by weight of a vinyl-containing polysiloxane of the formula:

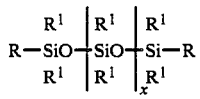

where R and $R^1$ are selected from substituted or unsubstituted hydrocarbon radicals of from 1 to 20 carbon atoms, such that the polymer contains from 0.0002 to 3% by weight vinyl and x varies such that the viscosity of the polymer varies from 100 to 1,000,000 centipoise at 25° C.;

(b) from 1 to 50 parts by weight of a hydride polysiloxane of the formula:

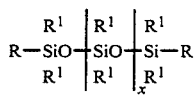

where $R^2$ is selected from the group consisting of, independently, hydrogen, alkyl radicals of from 1 to 8 carbon atoms, aryl radicals of from 1 to 8 carbon atoms, haloalkyl radicals of 3 to 8 carbon atoms and simultaneously, a single —O— to form a cyclic polymer, and $R^3$ is selected from the group consisting of alkyl radicals of from 1 to 8 carbon atoms, aryl radicals of from 1 to 8 carbon atoms, and fluoroalkyl radicals of 3 to 8 carbon atoms, where the hydride polysiloxane has a hydrogen content varying from 0.3 to 1.6% by weight and z and y vary such that the polymer has a viscosity varying from 1 to 500 centipoise at 25° C.;

(c) a hydroxyl source selected from organic alcohol or organic alcohol in combination with water or hydroxylated organosiloxane in an amount to provide a molar ratio of from about 0.02/1 to about 15/1 of hydroxyl radicals to silicon-bonded hydrogen atoms of component (b);

(d) from about 1 to about 250 parts per million of platinum catalyst; and (e) an amount of ketoxime compound effective to lower foam density of the formula:

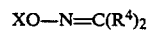

where each $R^4$ is independently a substituted or unsubstituted monovalent hydrocarbon of from 1 to about 10 carbon atoms or both $R^4$ groups combined are fused to a single substituted or unsubstituted divalent hydrocarbon of from 1 to about 15 carbon atoms, X is hydrogen, a substituted or unsubstituted silyl, or a substituted or unsubstituted hydrocarbon of from 1 to 5 carbon atoms; and (f) from 0 to 200 parts by weight of filler.

40. The composition of claim 39 which contains from 10 to 100 parts by weight of filler.

* * * * *